Sept. 28, 1954    H. TILCH ET AL    2,690,270
CHARGING AND DISCHARGING DEVICE FOR VEHICLES
Filed Aug. 15, 1951    2 Sheets-Sheet 1
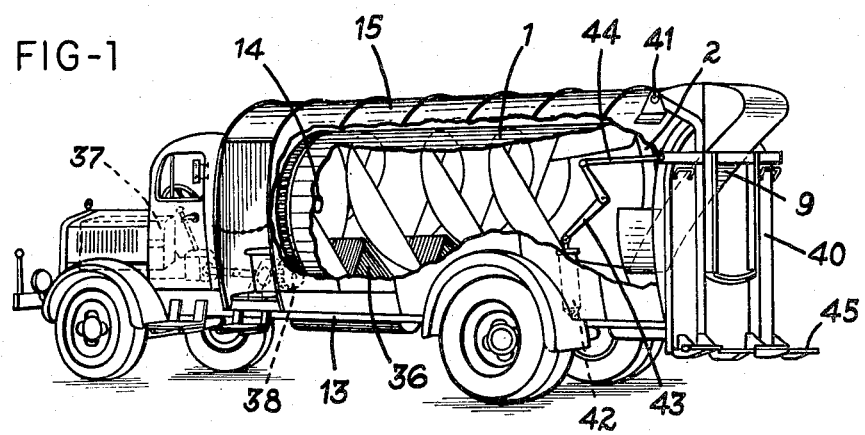
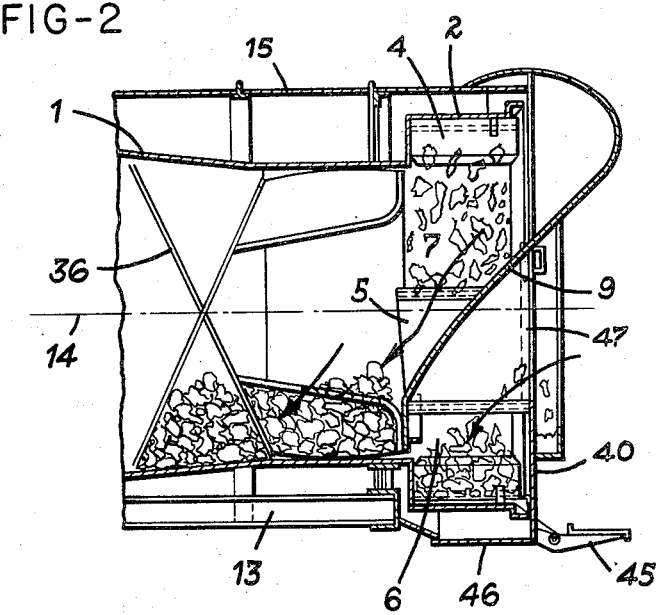
INVENTORS
HANS TILCH &
BY   WALTER GABLER
ATTORNEYS

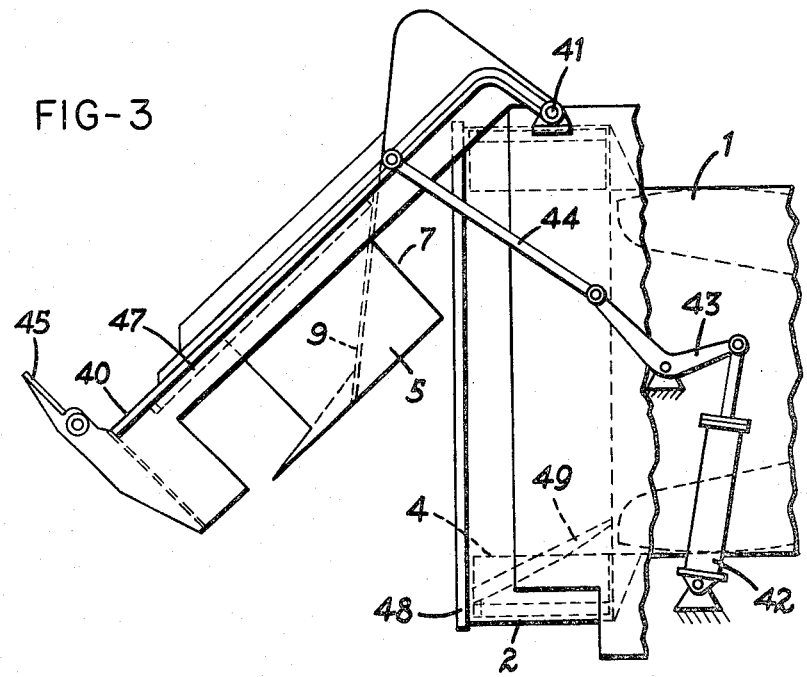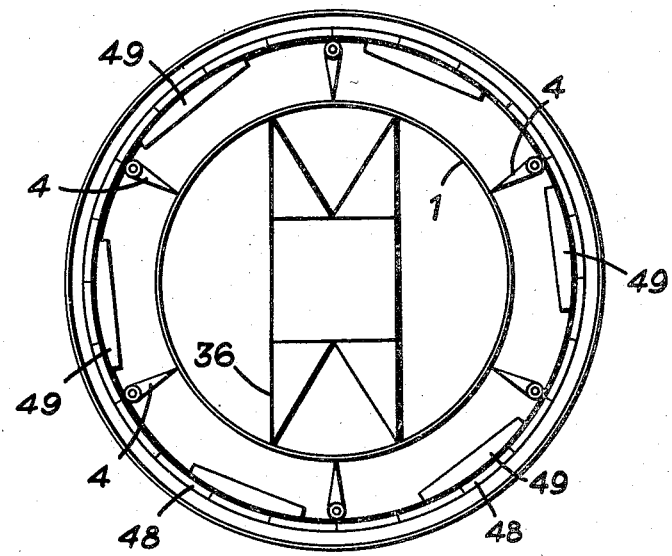

Patented Sept. 28, 1954

UNITED STATES PATENT OFFICE 2,690,270

CHARGING AND DISCHARGING DEVICE FOR VEHICLES

Hans Tilch, Augsburg-Goggingen, and Walter Gabler, Stuttgart-Zuffenhausen, Germany, assignors to Keller and Knappich G. m. b. H. Maschinenfabrik, Augsburg, Germany, a corporation of Germany Application August 15, 1951, Serial No. 241,912

Claims priority, application Germany August 17, 1950

10 Claims. (Cl. 214—507)

This invention relates to an arrangement for charging and discharging the drum-like containers of vehicles carrying loose material, especially refuse vehicles, which comprises a conveyer blade rotating together with the container about the longitudinal axis thereof, wherein there is provided on the charging and discharging side of the said container a conveyor wheel which rotates together with the said container about the longitudinal axis thereof and there is so provided within the said blade wheel a chute which remains stationary in relation thereto that in the charging the loose material falling out of the conveyor wheel slides into the rotating container. The device in accordance with the invention does not depend on a special design of the container drum. Special advantages are attained, however, in connection with a container with single thread conveyor surfaces and with conveyor surfaces whose conveying direction during the loading is opposed to the direction of rotation. In the first case our novel system will considerably accelerate the loading speed in general and in the second case it will accelerate the same primarily in the period up to the filling of the container drum to half the total height, where, as is well known, the material accumulates at the charging end of the container. This, however, will not be a disadvantage where the invention is applied and will not be noticeable at all from the outside. This conveying method has the great advantage that the container drum can be filled fully without ever requiring a change of the direction of rotation—not even for unloading—nor is the provision of a reversing gear required. So far, owing to the unfavourable reaction of the accumulation of the dust at the charging end and during the first half period of the filling operation this conveying method was not practicable. This drawback is removed by the present invention.

According to a further feature of the invention the walls externally bounding the blade spacing should be removable, more especially by pivoting, for the purpose of discharging. Thus, the blade wheel is rendered inoperative during the discharging in that the refuse need not be conveyed through the narrow passage between the blades. Although the blade wheel is of such dimensions that it conveys satisfactorily even the largest and bulkiest loose pieces of loose material in the charging, it must be taken into consideration that there occurs within the rotating drum-shaped container a compression of the refuse which may in certain circumstances cause bulky pieces to become attached together to form conglomerations larger than those occurring during the actual charging. This danger is particularly likely to arise in refuse carts which do not work with uniform refuse containers. In accordance with the present application this danger is avoided.

However, the whole blade wheel is not withdrawn by pivoting, but it is sufficient for only the walls outwardly bounding the blade spacing to be removed, for which purpose the entire stationary insert of the blade wheel, of which the chute also forms part, is combined with the external end wall of the blade spacing to form a cover which is adapted to be swung upward about a fixed axis lying substantially midway of the width thereof. Preferably, the foot boards or steps for the operators effecting the charging are also provided on this cover so that they cannot be covered with refuse during the discharging operation, but are on the contrary cleaned by the tilting movement. In addition, the pivotal cover preferably carries an auxiliary receptacle for receiving the clearance losses (i. e., the small fraction of refuse which may leak past the outer ends of the blade wheel blades), which receptacle is also emptied by the tilting. A further advantage of the invention resides in that the packing collar necessary in other constructions, which is always subject to considerable wear, and thus necessitates constant repairs is not required. In accordance with the invention, this is achieved by reason of the fact that an auxiliary blade wheel arrangement for the clearance losses is provided outside the joint between the blade wheel and its outer boundary wall. These clearance losses or material leaking past the blade wheel are consequently automatically returned into the blade wheel at the top of its rotation and thus into the main container. Only small leakages of these clearance losses leak past such auxiliary blade wheel arrangement and fall into the auxiliary receptacle, which consequently only has to take up a very small fraction of the clearance losses previously usual.

Further details of the invention will be seen from the drawings, which show an embodiment by way of example, and in which the same reference numerals are employed for the same parts in the figures. In these drawings:

Fig. 1 is a general view of the dust cart.

Fig. 2 is an axial section, in the loading position.

Fig. 3 is a side elevation showing the discharging position.

Fig. 4 is an end elevation in the direction of the blade wheel without the cover.

Referring now to the drawings in greater detail and first to Fig. 1, it will be seen that the drum-shaped container or tank 1 bears at its charging end a blade wheel 2 and in its interior conveying guide plates or sheets 36. It is rotated from the driving motor 37 of the cart, through a gear 38, in a direction of rotation which is opposed to the conveying direction of the conveyer guide sheets 36 during the charging, and which is maintained also for the unloading operation. The inside of the blade wheel 2 provided with the blades 4 is open and covered to the right and to the left by a fixedly mounted cylindrical insert 5 having the same width as the blade wheel 2. This insertion leaves open a lower opening 6 and an upper opening 7, and further comprises a chute 9 leading into the interior of the container 1. In the charging position, the refuse slides along this chute into the interior of the container (Fig. 2). The drum 1 mounted for rotation about the axis 14 is surrounded by a casing 15 fixed on the chassis 13.

For the purpose of discharging, the fixed insert 5 is combined with the chute 9 and the outer boundary wall 40 for the blade spacing situated between the blades 4 to form a cover, which is arranged to be swung upwards about a fixed pin 41 situated midway of its width, which is effected by means of the compressed-air cylinder 42 through the double-armed lever 43 and the rod 44.

The cover carries the foot boards or steps 45 for the operators effecting the charging and the receptacle 46 for the clearance losses. As shown in Fig. 3, both the steps 45 and the receptacle 46 move into an inclined position during the discharge and are thus emptied. When the cover is swung, as is shown in Fig. 3, the blade wheel is without its outer boundary wall, so that the refuse falls out quite freely. In order to ensure complete emptying of the blade spaces, low inclined guide plates 49 are provided between the blades 4. On the other hand, when the cover is closed during the charging, the blade spacing is closed at the rear, the boundary wall 40 remaining stationary. The clearance losses falling through the joint between the blade wheel 2 and the sealing rim 47 pass into the blade wheel 48, which is covered by the edge of the sealing rim 47, which extends along about two-thirds of the circumference. Only the clearance losses then remaining fall into the receptacle 46.

We claim:

1. Apparatus for loading and unloading trucks adapted for carrying loose bulk material comprising in combination a tank rotatably mounted horizontally on said vehicle for containing said material and having an opening at one end, a blade wheel mounted coaxially with said tank at said open end thereof for rotation therewith, conveyor blade means within said blade wheel for lifting loose bulk material introduced into the bottom of said blade wheel and releasing said material from the top of said blade wheel, a cover for the outer end of said blade wheel, passage means through said cover communicating with said blade wheel for introducing said loose bulk material into the lower portion of said blade wheel, guide means through said blade wheel for conducting into said tank loose bulk material released from the top of said blade wheel into said tank, and pivot means for tilting said cover and said passage and guide means upwardly away from said blade wheel for opening said blade wheel and said open end of said tank to discharge therefrom loose bulk material previously loaded thereinto.

2. Apparatus for loading and unloading trucks adapted for carrying loose bulk material comprising in combination a tank mounted horizontally on said vehicle for containing said material and having an opening at one end, a plurality of inclined guide blades within said tank for distributing said material therethrough, a blade wheel mounted coaxially with said tank at said open end thereof, conveyor blades within said wheel inwardly projecting toward the center thereof for lifting loose bulk material from the bottom to the top of said blade wheel, means for rotating said blade wheel and said tank together about the common axis thereof, a cover for the outer end of said blade wheel, pivot means for mounting said cover for upward tilting movement away from said blade wheel, passage means through said cover defining a material receiving opening therein, guide means from said cover into said tank for conducting loose bulk material from said conveyor blades in the top of said blade wheel into said tank, and means for tilting said cover and said passage and guide means upwardly away from said blade wheel for opening said blade wheel and said open end of said tank to discharge therefrom loose bulk material previously loaded thereinto.

3. Apparatus for loading and unloading trucks adapted for carrying loose bulk material comprising in combination a tank mounted horizontally on said vehicle for containing said material and having an opening at one end, rotating worm conveyor means for feeding said loose bulk material through said tank, a rotatable blade wheel mounted coaxially with said tank at said open end thereof, conveyor blade means within said blade wheel inwardly projecting toward the center thereof for lifting loose bulk material introduced into the bottom of said blade wheel and releasing said material from the top of said blade wheel, a cover for the outer end of said blade wheel, pivot means for mounting said cover for upward tilting movement away from said blade wheel, passage means through said cover defining a material receiving opening therein, guide means from said cover into said tank for conducting into said tank loose bulk material released by said conveyor blade means from the top of said blade wheel, and means for tilting said cover and said passage and guide means upwardly away from said blade wheel for opening said blade wheel and said open end of said tank to discharge therefrom loose bulk material previously loaded thereinto.

4. Apparatus for loading and unloading trucks adapted for carrying loose bulk material comprising in combination a tank mounted horizontally on said vehicle for containing said material and having an opening at one end, a blade wheel rotatably mounted coaxially with said tank at said open end thereof, conveyor blades on the inside of said blade wheel, a cover for the outer end of said blade wheel, pivot means for mounting said cover for upward tilting movement away from said blade wheel, passage means through said cover defining a material receiving opening therein, guide means from said cover into said tank for conducting loose bulk material from the top of said blade wheel into said tank, auxiliary blade means around the periphery of said blade wheel for receiving and conveying loose bulk material leaking past said conveyor blades in said blade wheel, and means for tilting said cover and said passage and guide means upwardly away from said blade wheel for opening said blade wheel and said open end of said tank to discharge therefrom loose bulk material previously loaded thereinto.

5. Apparatus for loading and unloading trucks adapted for carrying loose bulk material comprising in combination a tank mounted horizontally on said vehicle for containing said material and having an opening at one end, a blade wheel mounted coaxially with said tank at said open end thereof, conveyor blades on the inside of said blade wheel, a cover for the outer end of said blade wheel, pivot means for mounting said cover for upward tilting movement away from said blade wheel, passage means through said cover defining a material receiving opening therein, guide means from said cover into said tank for conducting loose bulk material from the top of said blade wheel into said tank, auxiliary blade means around the periphery of said blade wheel for receiving and conveying loose bulk material leaking past said conveyor blades in said blade wheel, an auxiliary receptacle on said cover for receiving loose bulk material leaking past said auxiliary blade means, means periodically emptying said auxiliary receptacle, and means for tilting said cover and said passage and guide means upwardly away from said blade wheel for opening said blade wheel and said open end of said tank to discharge therefrom loose bulk material previously loaded thereinto.

6. Apparatus for loading and unloading trucks adapted for carrying loose bulk material comprising in combination a tank mounted horizontally on said vehicle for containing said material and having an opening at one end, a blade wheel mounted coaxially with said tank at said open end thereof, conveyor blades on the inside of said blade wheel, a cover for the outer end of said blade wheel, pivot means for mounting said cover for upward tilting movement away from said blade wheel, passage means through said cover defining a material receiving opening therein, guide means from said cover into said tank for conducting loose bulk material from the top of said blade wheel into said tank, auxiliary blade means around the periphery of said blade wheel for receiving and conveying loose bulk material leaking past said conveyor blades in said blade wheel, an auxiliary receptacle on said cover for receiving loose bulk material leaking past said auxiliary blade means, and means for tilting said cover and said passage and guide means and said auxiliary receptacle upwardly away from said blade wheel for opening said blade wheel and said open end of said tank to discharge therefrom loose bulk material previously loaded thereinto.

7. Apparatus for loading and unloading trucks adapted for carrying loose bulk material comprising in combination a tank mounted horizontally on said vehicle for containing said material and having an opening at one end, rotating worm conveyor means for feeding said loose bulk material through said tank, a blade wheel mounted coaxially with said tank at said open end thereof, conveyor blade means within said blade wheel inwardly projecting toward the center thereof for lifting loose bulk material introduced into the bottom of said blade wheel and releasing said material from the top of said blade wheel, a cover for the outer end of said blade wheel, pivot means for mounting said cover for upward tilting movement away from said blade wheel, passage means through said cover defining a material receiving opening therein, guide means from said cover into said tank for conducting into said tank loose bulk material dropped by said conveyor means from the top of said blade wheel, inclined discharged members in said blade wheel between said conveyor blades for emptying said wheel upon tilting movement of said cover, and means for tilting said cover and said passage and guide means upwardly away from said blade wheel for opening said blade wheel and said open end of said tank to discharge therefrom loose bulk material previously loaded thereinto.

8. In a vehicle adapted for carrying loose bulk material and having a tank for containing said material and rotating blade wheel means for receiving, lifting and dropping said material, the combination which comprises a cover for said blade wheel, pivot means for mounting said cover adjacent the top thereof for upward tilting movement away from said wheel, a hollow cylindrical insert through said wheel carried by said cover and defining an opening therein, an inclined chute traversing said insert downwardly from the outside of said wheel toward the inside of said tank, said chute and said insert defining beneath said chute a material receiving passage communicating with the lower portion of said blade wheel and defining above said chute a charging passage for guiding into said tank loose bulk material dropped upon said chute from the upper portion of said wheel, and means for tilting said cover and said chute and said insert upwardly away from said wheel for opening said tank to discharge therefrom loose bulk material previously loaded thereinto.

9. Apparatus for loading and unloading trucks adapted for carrying loose bulk material comprising in combination a drum shaped tank mounted horizontally on said vehicle for containing said material, said tank having an opening at one end for receiving said material, a hollow blade wheel mounted coaxially with said tank at said open end thereof, means for rotating said tank and said wheel together about the common axis thereof, a cover for the outer end of said wheel, pivot means for mounting said cover adjacent the top thereof for upward tilting movement away from said wheel, a hollow cylindrical insert through said wheel carried by said cover and defining an opening therein, an inclined chute traversing said insert downwardly from the outside of said wheel toward the inside of said tank, said chute and said insert defining beneath said chute a material receiving passage communicating with the lower portion of said wheel and defining above said chute a charging passage for guiding into said tank loose bulk material dropped upon said chute from the upper portion of said wheel, inclined discharge plates in said wheel for ejecting loose bulk material from said wheel, auxiliary blade means around the outer periphery of said wheel for receiving and carrying loose bulk material leaking from said wheel, a receptacle at the bottom of said cover for receiving loose bulk material leaking from said auxiliary blade means, and means for tilting said cover and said insert and said receptacle together about said pivot means upwardly away from said wheel for emptying said insert and said receptacle and for opening said open end of said tank for discharge therefrom of said loose bulk material.

10. Apparatus for loading and unloading trucks adapted for carrying loose bulk material comprising in combination a drum shaped tank mounted horizontally on said vehicle for containing said material, a plurality of inclined conveying guide blades within said tank for distributing said material through said tank during rotation thereof, said tank having an opening at one end for receiving said material, a hollow wheel mounted coaxially with said tank at said open end thereof, means for rotating said tank and said wheel together about the common axis thereof, conveyor blades within said wheel inwardly projecting toward the center thereof, a cover for the outer end of said wheel, pivot means for mounting said cover adjacent the top thereof for upward tilting movement away from said wheel, a hollow cylindrical insert through said wheel mounted substantially coaxially therewith and centrally of said conveyor blades, said insert extending through said cover and defining an opening therein, means for mounting said insert on said cover for tilting movement therewith upwardly out of said wheel, an inclined chute traversing said insert downwardly from the outside of said wheel toward the inside of said tank, said chute and said insert defining beneath said chute a material receiving passage communicating with said conveyor blades at the lower portion of said wheel and defining above said chute a charging passage for guiding into said tank loose bulk material dropped upon said chute by said conveyor blades at the upper portion of said wheel, inclined discharge plates in said wheel between said conveyor blades for ejecting loose bulk material from said wheel, auxiliary blade means around the outer periphery of said wheel for receiving and carrying loose bulk material leaking from said conveyor blades in said wheel, a receptacle at the bottom of said cover for receiving loose bulk material leaking from said auxiliary blade means, and means for tilting said cover and said insert and said receptacle together about said pivot means upwardly away from said wheel for emptying said insert and said receptacle and for opening said open end of said tank for discharge therefrom of said loose bulk material.

References Cited in the file of this patent

UNITED STATES PATENTS

| Number | Name | Date |
|---|---|---|
| 1,753,135 | Schuberth | Apr. 1, 1930 |
| 1,961,587 | Hulley et al. | June 5, 1934 |
| 1,991,297 | Schluter | Feb. 12, 1935 |
| 2,000,631 | Windecker | May 7, 1935 |

FOREIGN PATENTS

| Number | Country | Date |
|---|---|---|
| 495,703 | Germany | Aug. 19, 1930 |
| 745,144 | France | Feb. 7, 1933 |
| 790,709 | France | Sept. 16, 1935 |